United States Patent [19]

Katsuta

[11] Patent Number: 4,947,259
[45] Date of Patent: Aug. 7, 1990

[54] IMAGE SIGNAL COMPRESSING DEVICE

[75] Inventor: Yuji Katsuta, Yamatokoriyama, Japan

[73] Assignee: Sharp Kabushiki Kaisha, Osaka, Japan

[21] Appl. No.: 222,091

[22] Filed: Jul. 20, 1988

[30] Foreign Application Priority Data

Jul. 22, 1987 [JP] Japan .................. 62-184124

[51] Int. Cl.⁵ .............................. H04M 1/41
[52] U.S. Cl. .................... 358/426; 358/429; 358/457
[58] Field of Search .............. 358/429, 430, 426, 457

[56] References Cited

FOREIGN PATENT DOCUMENTS

| | | | |
|---|---|---|---|
| 54-116822 | 11/1979 | Japan | 358/430 |
| 55-105474 | 8/1980 | Japan | 358/429 |
| 57-4660 | 1/1982 | Japan | 358/430 |
| 57-52281 | 3/1982 | Japan | 358/430 |
| 59-161183 | 9/1984 | Japan | 358/429 |
| 60-244160 | 12/1985 | Japan | 358/430 |

Primary Examiner—Edward L. Coles, Jr.

[57] ABSTRACT

An image compressing device is described, which includes a circuit for dividing the binary signal into predetermined areas and for converting the binary signal into codes corresponding to predetermined patterns one for each predetermined area. It further includes a circuit for detecting a difference between the pattern corresponding to the code and the binary image signal, a multi-digit compressing circuit for compressing the code, and a binary compressing circuit for compressing the difference.

11 Claims, 1 Drawing Sheet

IMAGE SIGNAL COMPRESSING DEVICE

BACKGROUND OF THE INVENTION

1. Field of the Invention

The present invention relates to an image signal compressing device adapted for use in a facsimile machine and an electronic filing machine.

2. Description of the Prior Art

Recently, a device has been developed which, when used in a facsimile machine or an electronic filing machine, operates to convert an image of intermediate gradation into a binary image signal according to a dither process.

It has, however, been found that, when the binary image signal, converted by the above described device, is compressed according to an MR code or a modified Hoffman (MH), which is a coding (compressing) system standardized in the facsimile machines, the compression ratio tends to be considerably lowered.

SUMMARY OF THE INVENTION

Accordingly, the present invention has been devised with a view to substantially eliminating the above described problem and provides, as its essential object to, an improved image compressing device effective to increase the compression ratio of the binary image signal of an intermediate gradation without being accompanied by a reduction in image quality.

In order to accomplish the above described object, the present invention provides an improved image compressing device which includes a means for dividing the binary signal into predetermined areas and for converting the binary signal into codes corresponding to predetermined patterns one for each predetermined area. It further includes means for detecting a difference between the pattern corresponding to the code and the binary image signal, a multi-digit compressing device for compressing the code, and a binary compressing device for compressing the difference.

According to the present invention, the compression ratio can be increased, without being accompanied by reduction in image quality, by separating the binary signal, according to a dither process, into the pattern obtainable from a dither matrix and the difference, and then compressing them individually.

BRIEF DESCRIPTION OF THE DRAWINGS

This and other objects and features of the present invention will become clear from the following description taken in conjunction with a preferred embodiment thereof with reference to the sole accompanying drawing which illustrate, in schematic block circuit representation, an image signal compressing device according to the present invention.

DETAILED DESCRIPTION OF THE EMBODIMENT

Figure 1:
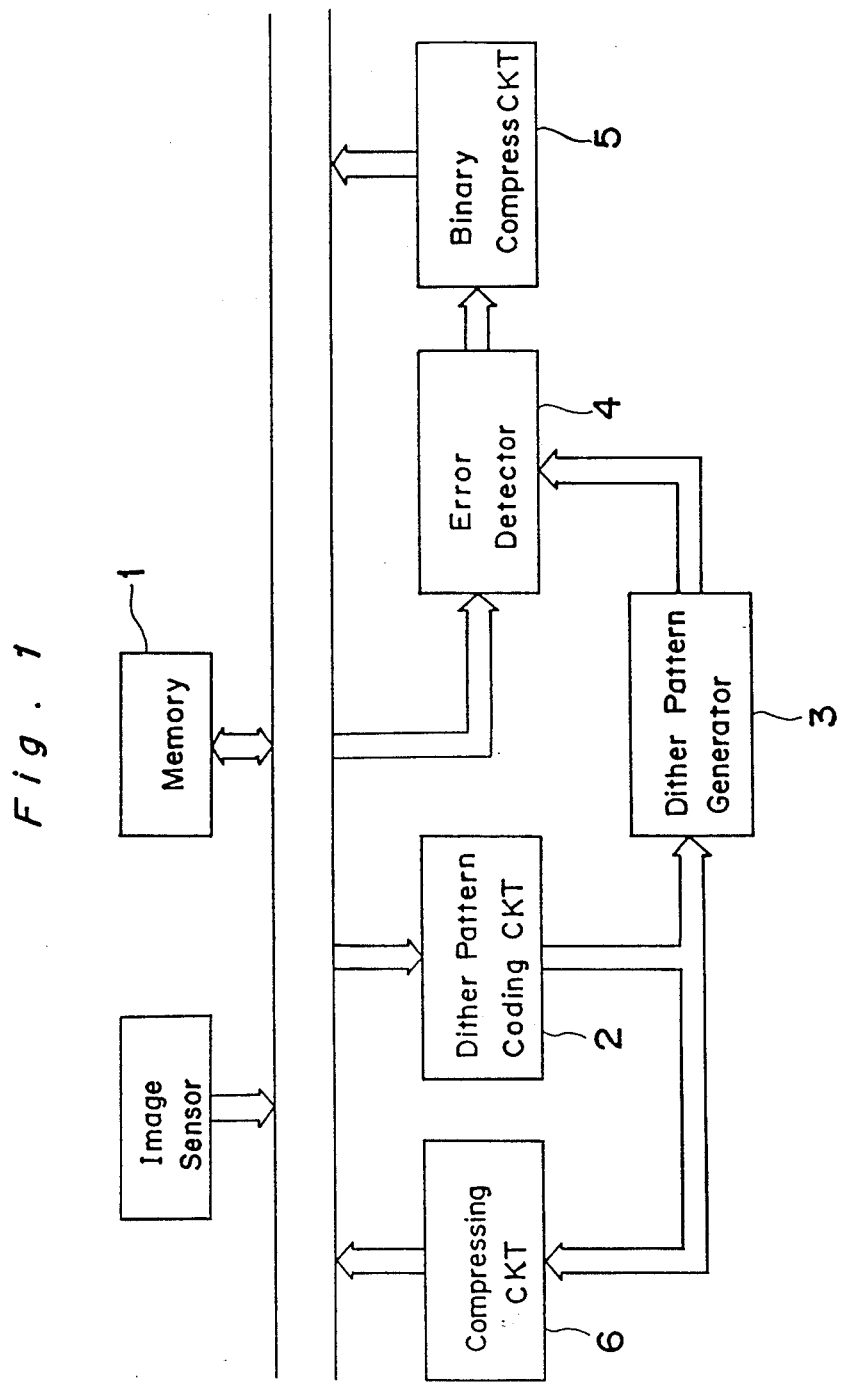

Referring to the sole accompanying drawing, reference numeral 1 represents a memory unit including a binary image data storage area, a multi-digit compressing data storage area and a binary compressing data storage area. Reference numeral 2 represents a dither pattern coding circuit adapted to receive a binary data read out from the binary image data storage area of the memory unit 1 for each 4×8 bit area, which coincides with a dither matrix, for coding the binary data according to a predetermined algorithm. Reference numeral 3 represents a dither pattern generator for developing a dither code, outputted from the dither pattern coding circuit 2, into a pattern of 4×8 bits. Reference numeral 4 represents an error detector operable to determine an exclusive OR logic between an output data from the dither pattern coding circuit 2 and the original binary data, outputted from the dither pattern generator 3, and then to output a difference data representative of the exclusive OR logic. Reference numeral 5 represents a binary compressing circuit operable to compress the difference signal from the error detector 4 into binary compressing data, which is in turn stored in the binary compressing data storage area of the memory unit.

Reference numeral 6 represents a multi-digit compressing circuit operable to compress a dither code, outputted from the dither pattern coding circuit 2, into multi-digit compressed data, which is in turn stored in the multi-digit compressing data storage area of the memory unit 1.

While the image signal compressing device is so constructed as hereinabove described, if all of the image data coincide with, for example, 33 4×8 bit matrixes obtained from the dither matrix, all of the difference data will be "0". Accordingly, the amount of data which is binary compressing data will be substantially "0". The number of the dither codes is 33 and the amount of data is compressed to about 5/32 in this instance. Therefore, further multi-digit compression can result in an increase of the compression ratio.

According to this technique, since the difference data is subjected to the binary compression separately, to provide the binary compressing data which is subsequently stored, no error will occur relative to the original binary image state when expanded.

In the foregoing embodiment of the present invention, although the area to be coded is made to coincide with the dither matrix, a similar effect can be obtained by coding only into a pattern of high frequency of reproduction if the area to be coded is not made to coincide with the dither matrix.

From the foregoing description, it is clear that, according to the present invention, the compression ratio of the binary image signal representative of the image having an intermediate gradation can be increased. Also, the data which has been compressed and then expanded can completely match with the original binary image signal, with no substantial reduction in quality of the image.

Although the present invention has been fully described in connection with the preferred embodiment thereof with reference to the accompanying drawing, it is to be noted that various changes and modifications are apparent to those skilled in the art. Such changes and modifications are to be understood as included within the scope of the present invention as defined by the appended claims unless they depart therefrom.

What is claimed is:

1. An image compressing apparatus, comprising:
   means for dividing a binary image signal into predetermined areas and for converting the binary image signal into codes corresponding to predetermined patterns, one for each predetermined area,
   means for detecting a difference between the patterns corresponding to the codes and the binary image signal, for each predetermined area;
   multi-digit compressing means for compressing said codes; and binary compressing means for compressing said difference.

2. An image compressing apparatus comprising:

memory means for storing an input binary signal in predetermined areas;

coding means for converting said input binary signal, stored in predetermined areas, into codes corresponding to predetermined patterns, one for each predetermined area;

first comprising means, connected to said coding means, for compressing each of said codes;

pattern generating means, connected to said coding means, for generating patterns corresponding to each of said codes;

difference detecting means for detecting a difference between the input binary signal and said generated patterns, for each of said predetermined areas;

second compressing means, connected to said difference means, for compressing each of said differences detected.

3. An apparatus, as claimed in claim 2, wherein said pattern generating means generates dither matrix patterns.

4. An apparatus, as claimed in claim 2, wherein each first compressing means is a multi-digit compressing means.

5. An apparatus, as claimed in claim 2, wherein said predetermined areas are $4 \times 8$ bit areas.

6. An apparatus, as claimed in claim 5, wherein said pattern generating means generates $4 \times 8$ bit dither matrix patterns corresponding to each $4 \times 8$ bit predetermined area.

7. An apparatus, as claimed in claim 6, wherein said difference detecting means exclusively—ORs said input binary signal and said generated patterns, for each of said predetermined areas.

8. A method for compressing an image comprising the steps of:

(a) storing an input binary signal in predetermined areas;

(b) converting said input binary signal stored in predetermined areas into codes corresponding to predetermined patterns, one for each predetermined area;

(c) generating patterns corresponding to each of said codes;

(d) detecting a difference between the input binary signal and said generated patterns, for each of said predetermined areas;

(e) compressing each of said difference detected, and (f) compressing each of said codes of step (b).

9. A method, as claimed in claim 8, wherein said patterns generated in step (c) are dither matrix patterns.

10. A method, as claimed in claim 9, wherein said predetermined areas are $4 \times 8$ bit areas.

11. A method, as claimed in claim 10, wherein said difference of step (d) is detected by exclusively—ORing said input binary signal and said generated patterns, for each of said predetermined areas.

* * * * *